(12) United States Patent
Ariza Martín et al.

(10) Patent No.: US 8,267,352 B2
(45) Date of Patent: Sep. 18, 2012

(54) STRUCTURE OF THE LOAD INTRODUCTION ZONE IN THE REAR END OF AN AIRCRAFT

(75) Inventors: Manuel Ariza Martín, Madrid (ES); Elena Arévalo Rodríguez, Madrid (ES); Francisco José Cruz Dominguez, Madrid (ES)

(73) Assignee: Airbus Operations S.L., Madrid (ES)

( * ) Notice: Subject to any disclaimer, the term of this patent is extended or adjusted under 35 U.S.C. 154(b) by 620 days.

(21) Appl. No.: 12/388,750

(22) Filed: Feb. 19, 2009

(65) Prior Publication Data
US 2010/0155532 A1 Jun. 24, 2010

(30) Foreign Application Priority Data
Dec. 18, 2008 (ES) .................................. 200803604

(51) Int. Cl.
*B64C 1/26* (2006.01)
(52) U.S. Cl. ...................................................... 244/119
(58) Field of Classification Search .................. 244/119, 244/87, 131, 133
See application file for complete search history.

(56) References Cited

U.S. PATENT DOCUMENTS

| 2,212,456 A * | 8/1940 | Rethel ........................... 244/119 |
| 5,024,399 A * | 6/1991 | Barquet et al. ................ 244/119 |
| 6,511,570 B2 * | 1/2003 | Matsui ........................... 156/245 |
| 2008/0001029 A1 | 1/2008 | Garcia Laja |
| 2008/0179460 A1 * | 7/2008 | Rodriguez et al. ............ 244/119 |

FOREIGN PATENT DOCUMENTS
WO 2008/092970 A1 8/2008
* cited by examiner

*Primary Examiner* — Milton Nelson, Jr.
(74) *Attorney, Agent, or Firm* — Ladas & Parry LLP

(57) ABSTRACT

Load introduction zone in the rear end of an aircraft comprising receiving elements (3, 4) of the loads of the horizontal and vertical tail stabilizers connected to structural elements (2, 8, 9) wherein: a) said structural elements are the cladding (8), two contiguous load-bearing frames (2) with a Π or omega cross-section and, at least, a third frame (9); b) the receiving element of the horizontal tail stabilizer load is a first fitting (3) structured as a torque box, transversely arranged between said load-bearing frames (2) and connected to them, and the receiving elements of the vertical tail stabilizer loads are some second fittings (4) coupled to these frames (2, 9); c) said frames (2, 9) and said first and second fittings (3, 4) are entirely made of composite material.

9 Claims, 6 Drawing Sheets

STRUCTURE OF THE LOAD INTRODUCTION ZONE IN THE REAR END OF AN AIRCRAFT

TECHNICAL FIELD OF THE INVENTION

This invention refers to the rear end of an aircraft, and in particular to the zone provided in it for the introduction of loads of the horizontal tail stabilizer (HTP) and vertical tail stabilizer (VTP).

STATE OF THE ART PRIOR TO THE INVENTION

The trimmable horizontal stabilizer of an aircraft is usually held by means of the coupling of the stabilizer to one or two pivot points and one or two attachment points. So that the horizontal stabilizer plane can trim in the one or two attachment points, it should vertically change its position to enable the stabilizer to pivot on the one or two pivot points. To make this change of position possible, it is usually provided with an engine/screw jack assembly secured by a fitting to the fuselage. The turning of the screw jack in one direction or the other determines whether the attachment point will rise or descend to achieve the trimming of the horizontal stabilizer.

The fitting that secures this screw jack is usually a very complex machined metal fitting, as the one shown in FIGS. 2 and 3. This fitting 1e is secured to a metal torque box formed by two lateral plates 1d and the webs of the two machined metal load-bearing frames 1a, 1b, to which these lateral plates 1d are connected. In some cases, the assembly is connected to a third frame 1c, also of metal, located between these two load-bearing frames 1a, 1b. In these cases, the metal fitting 1e for coupling the engine/screw jack assembly is secured to both the intermediate frame 1c and to the torque box by metal connecting elements.

The load-bearing frames 1a, 1b that secure the torque box have different sections, the most usual ones being the C-, I- and J-sections which, by means of machining processes, form a ribbed framework that stabilizes the web of the frame and provides it with the necessary rigidity and optimized weight.

The metal frames 1a, 1b are likewise the supports of the hold fittings of the vertical stabilizer.

As a whole, the known structures for the introduction zone of the horizontal stabilizer and vertical stabilizer loads in the fuselage of an aircraft are very complex, with the resulting drawbacks for their manufacturing and assembly.

For example, the shear connection of the fittings of the vertical tail stabilizer to the metal frames causes eccentric loads in these frames outside the plane of the frame, which requires that they be laterally stabilized with additional fittings or clips and through the torque box itself, which is used to hold the screw jack fitting, and this entails the use of a large number of components that complicate the manufacturing and assembly.

This invention is intended to overcome this drawback.

SUMMARY OF THE INVENTION

One object of this invention is to provide a rear end for an aircraft with a horizontal tail stabilizer and vertical tail stabilizer load introduction zone that is optimized in terms of its weight.

Another object of this invention is to provide a rear end for an aircraft with a horizontal tail stabilizer and vertical tail stabilizer load introduction zone that is easy to assemble.

These and other objects are achieved with a rear end for an aircraft with a horizontal tail stabilizer and vertical tail stabilizer load introduction zone that comprises receiving elements for the loads of these stabilizers connected to structural elements in which:

a) These structural elements of the rear end are the cladding, two contiguous load-bearing frames configured at least in this load introduction zone with two lateral elements and one base element, such that their cross section has a closed shape, and at least a third frame contiguous to one of these two load-bearing frames.

b) The receiving element of the horizontal tail stabilizer load is a first fitting structured as a torque box, with side walls and a cover and transversally arranged between these load-bearing frames and connected to them, and the receiving elements of the vertical stabilizer loads are some second fittings coupled to these frames.

c) These frames and these first and second fittings are entirely made of composite material.

In preferential embodiments of the invention, the cross section of these load-bearing frames has a Π or an omega shape. This results in a rear end with a tail stabilizer load introduction zone that is structured such that the distribution of loads and weight is optimized.

In another preferential embodiment of the invention, these load-bearing frames are shaped as unit parts, with their configuring elements connected prior to their assembly in the fuselage. This results in a rear end with a tail stabilizer load introduction zone that is structured with fewer parts.

In another preferential embodiment of the invention, the configuring elements of these load-bearing frames are shaped separately and are connecting during assembly in the fuselage. This results in a rear end with a tail stabilizer load introduction zone that is structured in a way to facilitate its assembly.

In another preferential embodiment of the invention, the ratio between the height of the two lateral elements (5a, 5b) and the diameter (D) of the load-bearing frames (2) in the attachment zone of the second fittings (4) ranges from 12-13%. This results in a rear end in which the available inner space can be more advantageously used.

In another preferential embodiment of the invention, the rear end includes a total number of five frames with two used as load-bearing frames, whose structure makes it possible to increase the distance between them. This results in a rear end with a tail stabilizer load introduction zone that is structurally optimized.

In other preferential embodiments of the invention, the first fitting also comprises omega-shaped laminates connected to the inner or outer sides of its side walls. This results in a rear end with a tail stabilizer load introduction zone with a fitting for receiving the loads of the horizontal stabilizer that is structurally optimized.

Other characteristics and advantages of this invention will become evident from the following detailed description of illustrative embodiments of its object, together with the accompanying figures.

DETAILED DESCRIPTION OF THE INVENTION

In the detailed description of the invention provided here, we refer to Airbus A320 type aircraft in which the rear end is a well differentiated part thereof (known as Section 19). In any event, for purposes of this invention, the term rear end should be understood as the rear end of the fuselage affected by a horizontal tail stabilizer and a vertical tail stabilizer.

Figure 1:
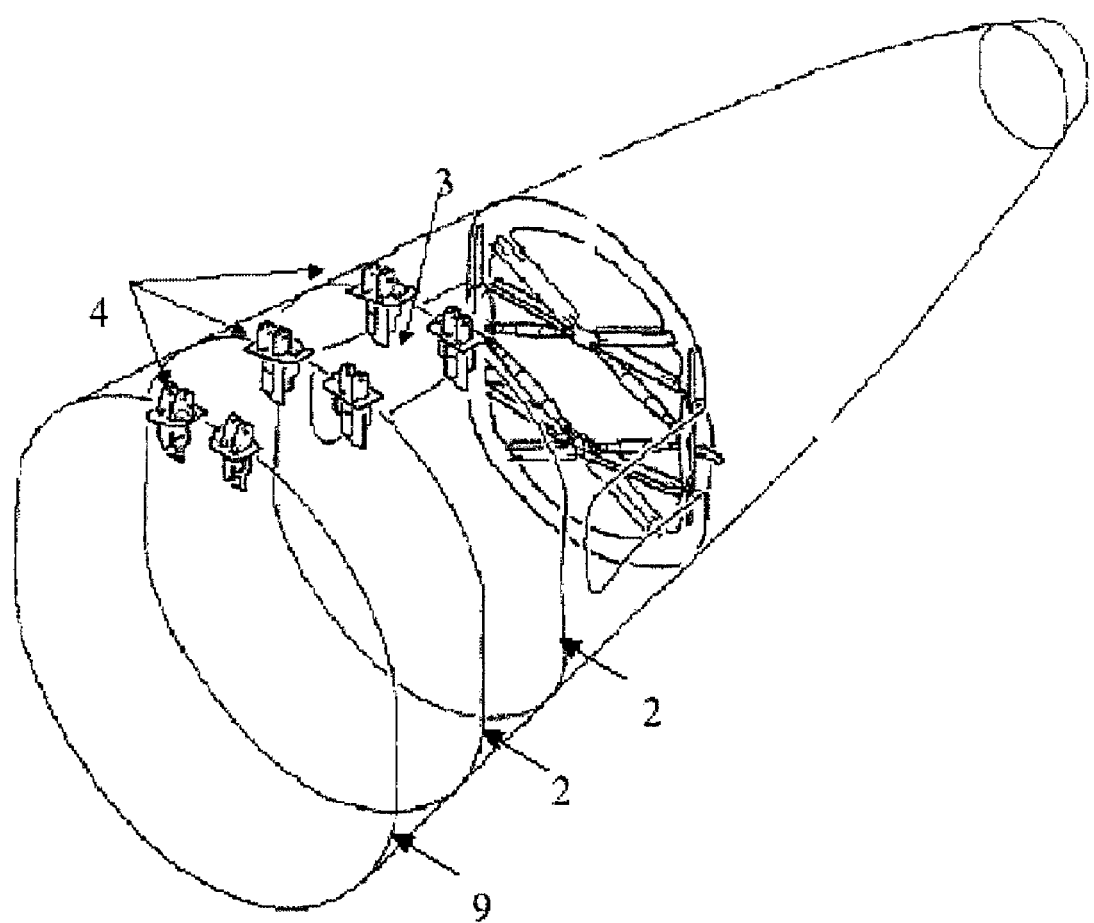
FIG. 1 is a schematic view of the structure of the horizontal tail stabilizer and vertical tail stabilizer load introduction zone in the rear end of an aircraft.
Figure 2:
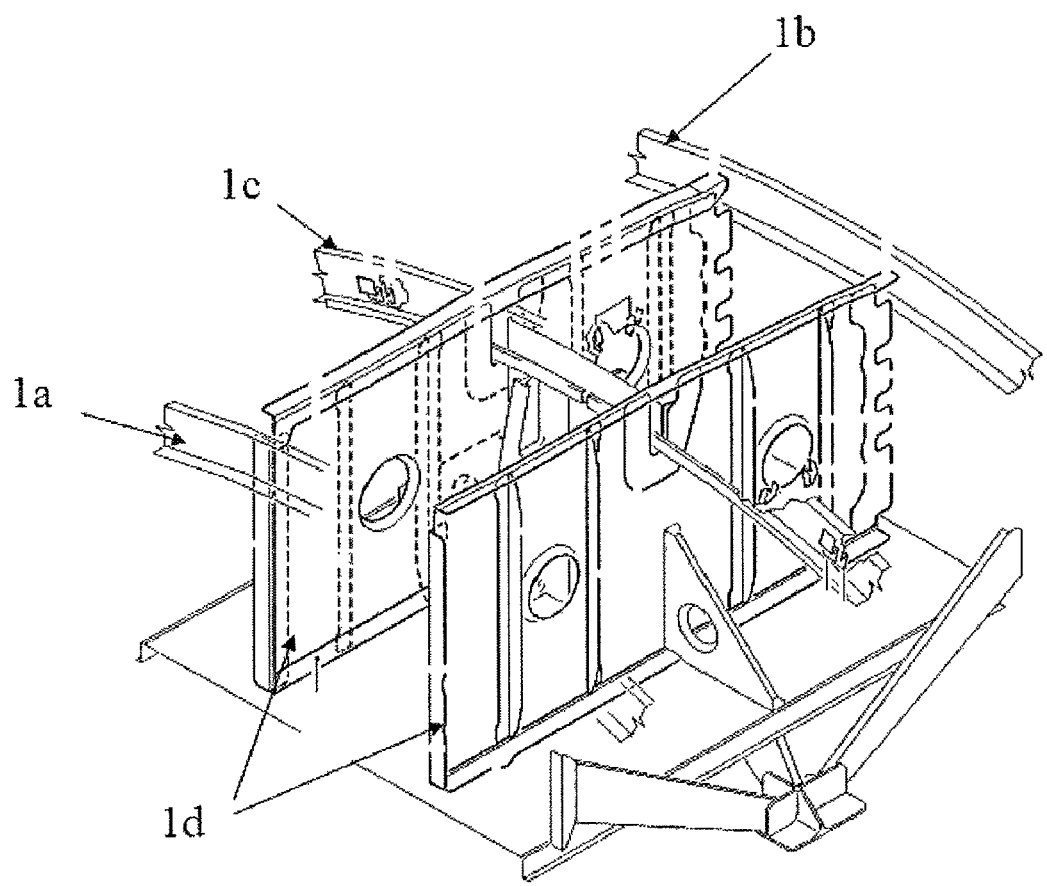
FIGS. 2 and 3 are perspective views of a metal fitting assembly with metal torque box connected to metal fittings known in the state of the art and used in the load introduction zone of the rear end of an aircraft.
Figure 3:
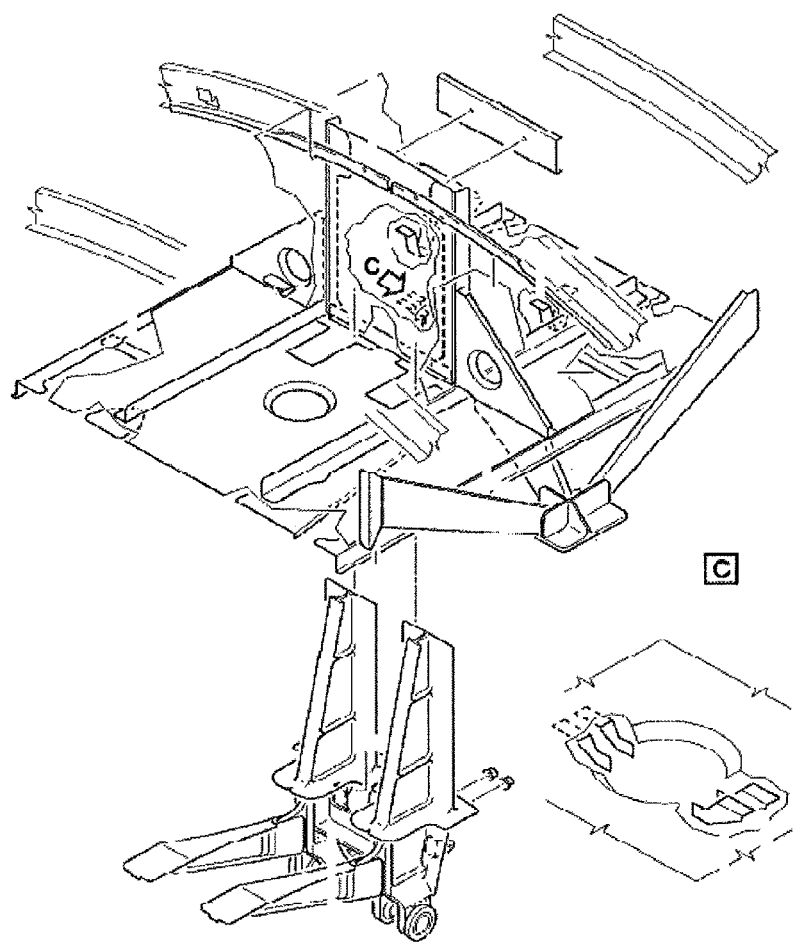
Figures 4A, 4B:
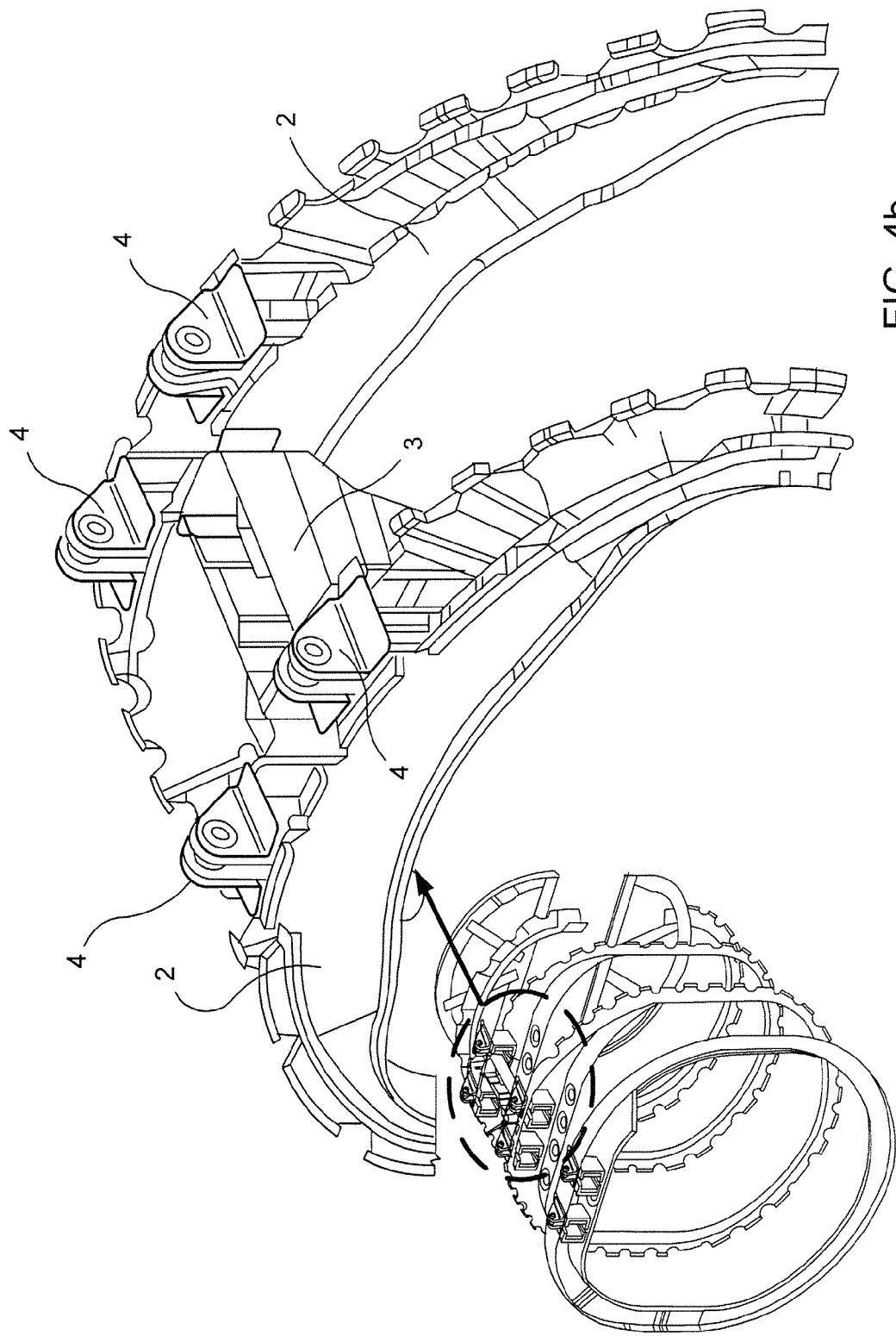
FIGS. 4a and 4b are perspective views of the structure of the horizontal tail stabilizer and vertical tail stabilizer load introduction zone in the rear end of an aircraft according to this invention, which illustrate the configuration of both the whole structure and its fundamental elements: the load-bearing frames and the fittings for receiving the horizontal tail stabilizer and vertical tail stabilizer loads.

Following FIGS. 4a and 4b that show the zone provided in the rear end for the introduction of the horizontal tail stabilizer and vertical tail stabilizer loads, the structure of this zone according to this invention comprises as basic elements the frames 2, 9, where the frame 2 are load-bearing frames, the box-fitting 3 for receiving the load of the horizontal tail stabilizer, which we will also call first fitting 3, and the fittings 4 for receiving the loads of the vertical tail stabilizer, which we will also call second fittings 4.

As we can see in the embodiment illustrated in FIG. 4a, there are six second fittings 4, four of which are coupled to the load-bearing frames 2 and two to the frame 9, although in other embodiments it is possible to use a different number of second fittings 4.

All these elements are made of composite materials, i.e., thermostable or thermoplastic materials reinforced with carbon fibre (CFRP) or fibreglass (GFRP).

The structure that is the object of this invention uses individually known elements. In this respect, the patent applications WO 2008/092970 and US 2008/0001029, which are included in this application by reference, describe embodiments of the frames 2 and the first fitting 3. However, none of these structural elements in themselves, as individual elements, is an object of this invention.

The basic idea of the invention is to provide a structure whose geometry provides a load distribution that optimizes the current metallic designs in terms of weight, i.e., to achieve an optimal load distribution with the fewest possible number of elements, all of them made of composite material.

Figure 5:
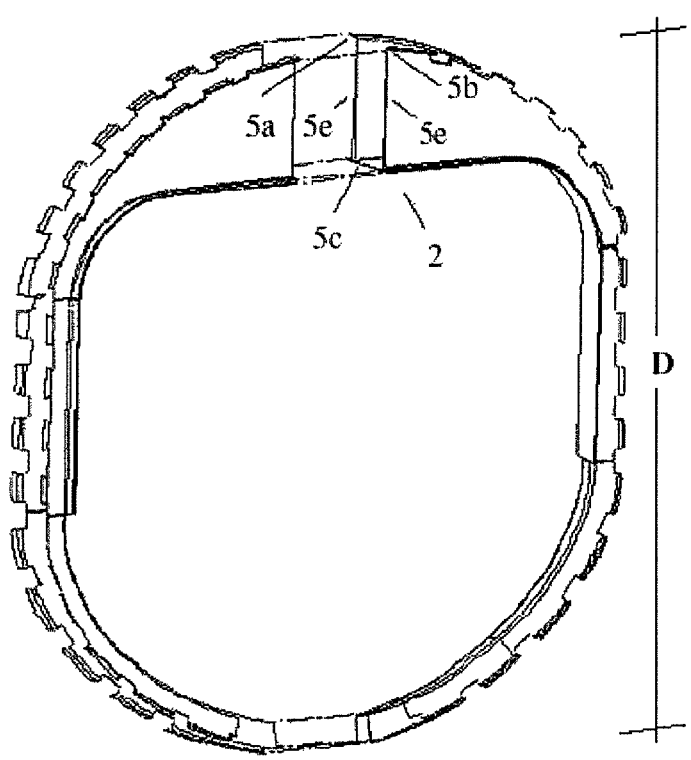
FIG. 5 is a perspective view of a load-bearing frame used in the structure of the horizontal tail stabilizer and vertical tail stabilizer load introduction zone in the rear end of an aircraft according to this invention.
Figure 6A:
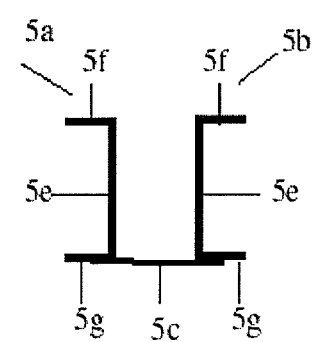
FIGS. 6a and 6b are schematic views of its cross section in two embodiments of the invention.

In the preferential embodiment illustrated in FIGS. 5 and 6a, the load-bearing frames 2 have an Π-shaped section that comprises three elements: two lateral elements 5a, 5b with webs 5e and upper and lower skirts 5f, 5g, and a base element 5c that connects the lower skirts of the two lateral elements 5a and 5b of the frame 2 and that, therefore, closes the section of this load-bearing frame 2. As can clearly be seen in FIG. 5, the dimension of the webs 5e is much greater in the horizontal tail stabilizer and vertical tail stabilizer load introduction zone than in the rest. The load-bearing frame 2 could even have sections with a shape other than Π in zones removed from the load introduction zone, such as sections with one lateral element with web and base forming a 90° angle and the other lateral element with web and base forming an angle greater than 90°, traditional C-, J- and I-sections, and even omega-shaped sections, with an adequate transition and connection, as shown in FIG. 5 at the bottom of the load-bearing frame 2.

Figure 6B:
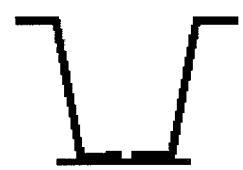

In another preferential embodiment of this invention illustrated in FIG. 6b, the load-bearing frame 2 could have an omega-shaped section instead of a Π-shaped section in the horizontal tail stabilizer and vertical tail stabilizer load introduction zone. The difference between the two sections would basically be that the webs 5e would be inclined at an angle greater than 90° with respect to their lower skirts.

These three elements 5a, 5b and 5c are preferably manufactured separately, each one with the necessary geometry and thickness, and the structure of the horizontal tail stabilizer and vertical tail stabilizer load introduction zone that is the object of this invention can be executed with these three separate elements 5a, 5b and 5c, proceeding to make the necessary connections both to each other and to the first and second fittings 3, 4 and to the cladding 8 during assembly of the structure.

The load-bearing frames 2 can also be assembled in a first phase, connecting the base element 5c to these lateral elements 5a, 5b and assembling the structure with the load-bearing frames 2 as unit parts.

One advantage of the first option is that it facilitates some assembly operations before completing the "closure" of the load-bearing frames 2, connecting the base element 5c to the lateral elements 5a, 5b.

Figure 7A:
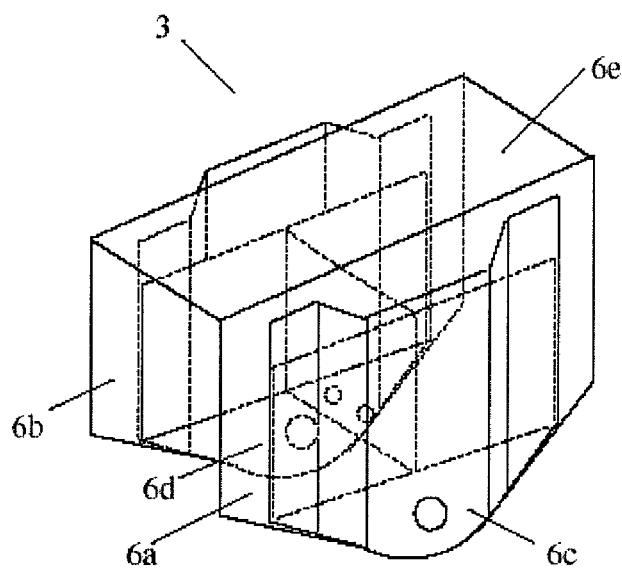
FIGS. 7a and 7b are, respectively, a perspective view and a side view of the load receiving fitting of the horizontal stabilizer used in the structure of the horizontal tail stabilizer and vertical tail stabilizer load introduction zone in the rear end of an aircraft according to this invention.
Figure 7B:
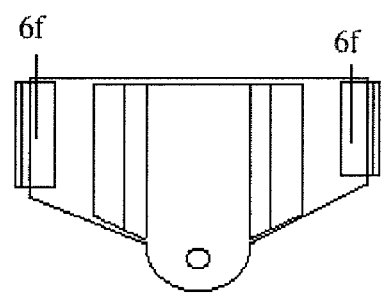

In a preferential embodiment of this invention illustrated in FIGS. 7a and 7b, the first fitting 3 is configured to secure and enable trimming of the horizontal tail stabilizer that is coupled to the engine/screw jack assembly. The primary hold consists of two lateral walls 6a, 6b and a cover 6e, together with two omega-shaped laminates 6c, 6d, which are connected to the outer sides of the side walls 6a, 6b. The first fitting 3 is connected to the load-bearing frames 2 by means of angle irons 6f.

In another preferential embodiment of the first fitting 3, illustrated in FIG. 4b, the omega-shaped laminates are connected to the inner sides of the side walls.

The load applied to the first fitting 3 is primarily vertical, although its structure is designed for the load-bearing components to react in the other two directions which are of a lesser magnitude. This is possible because of the concept of shear connection that exists in both the load-bearing frames 2 and in the fuselage cladding.

The loads applied to the screw jack fitting are directly transmitted through the primary feedthrough openings located in the side walls 6a, 6b of the first fitting 3 and in the head of the omega-shaped laminates 6c, 6d, to the webs 5e of the load-bearing frames 2 to which these side walls 6a, 6b are connected. There are also riveted or glued connections (not shown in FIG. 7a) to transfer the secondary loads to the side walls 6a, 6b of the first fitting 3.

Figure 8:
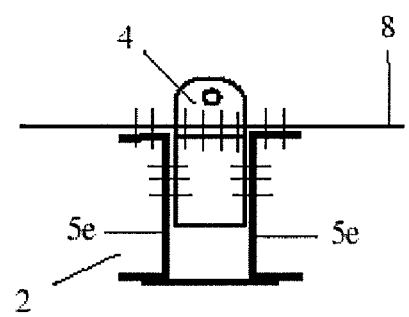
FIG. 8 is a cross-section view of a load receiving fitting of the vertical stabilizer used in the structure of the horizontal tail stabilizer and vertical tail stabilizer load introduction zone in the rear end of an aircraft according to this invention, connected to a load-bearing frame and to the cladding.

As for the second fittings 4 to introduce the vertical stabilizer load, the Figures show that four of them are coupled to the load-bearing frames 2 around the first fitting 3, and two of them are coupled to the frame 9 contiguous to the frame 2 that is further away from the fuselage tail. As shown in FIG. 8, the second fittings are connected to the frame 2 and to the cladding 8. The cross section closed in a Π or an omega shape of the load-bearing frames 2—and of the frame 9 if any—provides a very appropriate structure for reaction of the shear loads introduced by these second fittings 4 and also optimizes the connection of these fittings 4 on transmission of the load to the two webs 5e of the load-bearing frames 2.

Likewise, the attachment of the second fittings 4 to the Π- or omega-shaped load-bearing frames 2 decreases the number of parts to be used, as it avoids the problems of eccentricity that arise when these second fittings 4 are connected to traditional section frames (J, I, etc.), which require the use of counter-fittings for a suitable reaction of the loads applied to the assembly. On the other hand, the first fitting 3 stabilizes and stiffens the assembly.

With the structure that is the object of this invention, the ratio between the dimension of the lateral elements 5a, 5b and the diameter D (see FIG. 5) of the load-bearing frames 2 in the attachment zone of the second fittings 4 is significantly less than the 14-15% usually found in the known state of the art; instead it is in the range of 12-13%, which entails a significant advantage, especially in small- and medium-sized aeroplanes where the available space needs to used to the utmost advantage.

Structurally speaking, the geometry of the load-bearing frames 2 with a Π- or omega-section is providing better support to the cladding, making it more optimal in terms of buckling and weight because, due to the torsional rigidity of the section, the span between frames can be increased, i.e. the number of frames can be reduced. In fact, in a preferential embodiment of this invention, 5 frames are used in the rear end instead of the seven used in the A320.

Moreover, the load-bearing frames 2 with omega section offer the additional advantage of being self-stabilizing, i.e., they do not need other elements to assure their lateral stability.

On the other hand, as the structure of the horizontal tail stabilizer and vertical tail stabilizer load introduction zone comprises two load-bearing frames 2 and a fixed number of load introduction points of the second fittings 4, the distance between the webs 6e, to which the side walls 6a, 6b of the first fitting 3 are connected, is decreased, which means these walls are not as long and optimizes the buckling failure of these side walls.

The advantages of this invention over the previous state of the art include the following:

The load introduction zone in the rear end is structured with a fewer number of parts and less connections and, therefore, the assembly and manufacturing costs are lower and the structure weighs less.

The load distribution is improved, since the trimmable horizontal stabilizer actuator load is more directly transmitted to the walls of the first fitting 3, and the load of the second fittings 4 reacts more efficiently thanks to the closed Π- or omega-shaped cross section of the load-bearing frames 2.

In particular, the number of parts required to hold the second fittings 4 to the load-bearing frames 2 is decreased, as the Π- or omega-shaped section avoids the problems of eccentricity that arise when the fitting is connected to a frame with a traditional section (J, I, etc.), which requires the use of counter-fittings for a suitable reaction of the loads applied to the assembly.

Better support is provided to the cladding, optimizing it in terms of buckling and weight because, thanks to the torsional rigidity of the Π- or omega-shaped section of the load-bearing frames 2, the span between frames can be increased, i.e., the number of frames can be reduced.

If omega-shaped load-bearing frames 2 are used, it offers the advantage that they are self-stabilizing and, therefore, do not need other elements to assure their lateral stability.

Those modifications included within the scope of the following claims can be introduced into the preferential embodiment described above.

The invention claimed is:

1. Rear end of an aircraft with a horizontal tail stabilizer and vertical tail stabilizer load introduction zone that comprises receiving elements of the loads of these stabilizers connected to structural elements of the fuselage, wherein:
   a) the structural elements of the rear end are cladding, two contiguous load-bearing frames configured at least in this load introduction zone with two lateral elements and one base element, such that their cross section has a closed shape, and at least a third frame contiguous to one of these two load-bearing frames;
   b) the receiving element of the horizontal tail stabilizer load is a first fitting structured as a torque box, with side walls and a cover and transversally arranged between the load-bearing frames and connected to them, and the receiving elements of the vertical tail stabilizer loads are second fittings coupled to these frames; and
   c) the frames and the first and second fittings are entirely made of composite material.

2. Rear end of an aircraft, as per claim 1, wherein the cross section of the load-bearing frames has a Π shape.

3. Rear end of an aircraft, as per claim 1, wherein the cross section of these load-bearing frames has an omega shape.

4. Rear end of an aircraft, according to claim 1, wherein the load-bearing frames are shaped as unit parts, with configuring elements connected prior to their assembly in the fuselage.

5. Rear end of an aircraft, according to claim 1, wherein configuring elements of the load-bearing frames are shaped separately and are connected during assembly in the fuselage.

6. Rear end of an aircraft, according to claim 1, wherein said two lateral elements have a height and said load bearing frames have a diameter (D) proximate to the second fittings such that said height and said diameter have a ratio that ranges from 12-13%.

7. Rear end of an aircraft, according to claim 1, wherein the total number of its frames is 5.

8. Rear end of an aircraft, according to claim 1, wherein the first fitting also comprises omega-shaped laminates connected to the outer sides of its side walls.

9. Rear end of an aircraft, according to claim 1, wherein the first fitting also comprises omega-shaped laminates connected to the inner sides of its side walls.

* * * * *